United States Patent Office 3,352,179
Patented Nov. 14, 1967

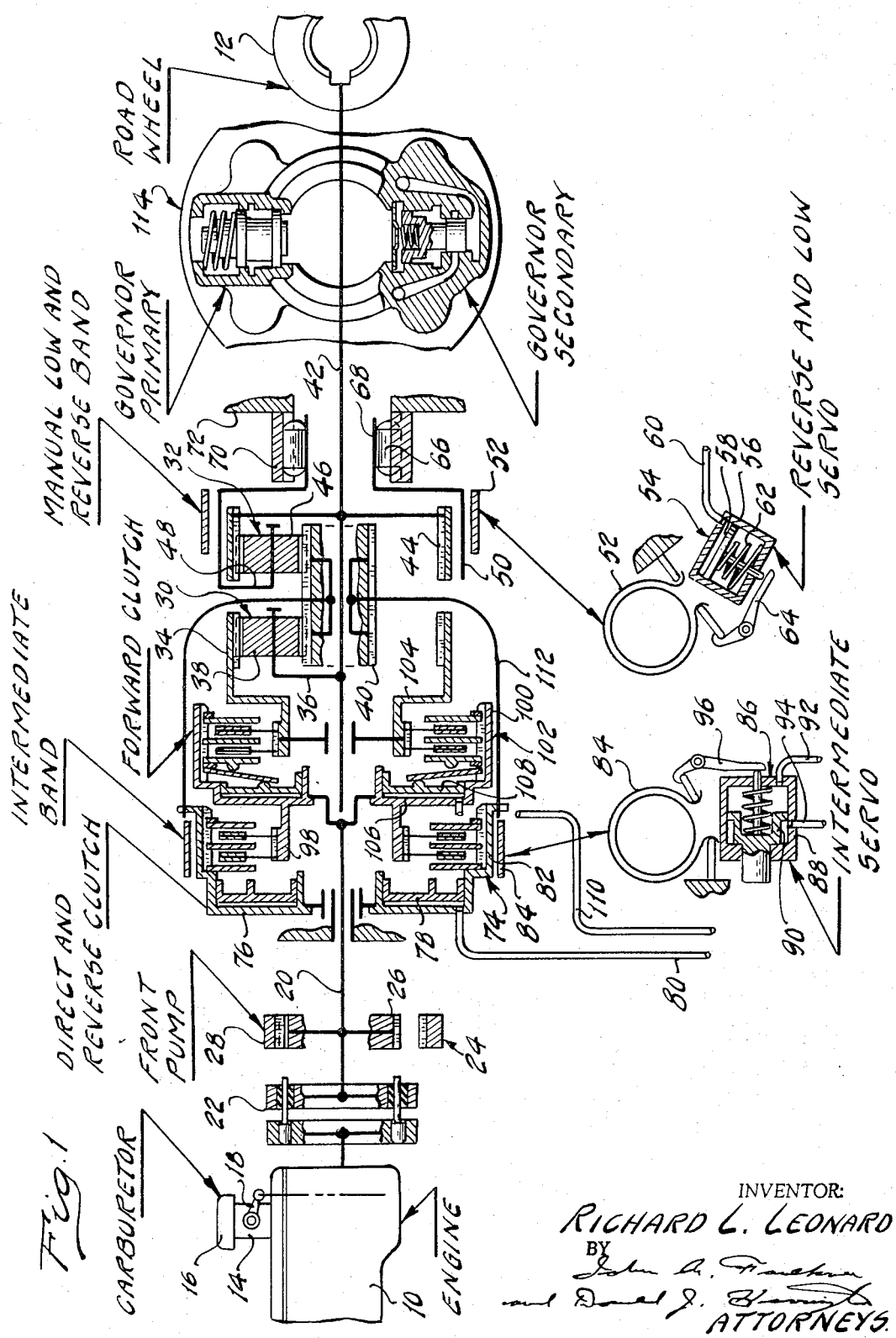

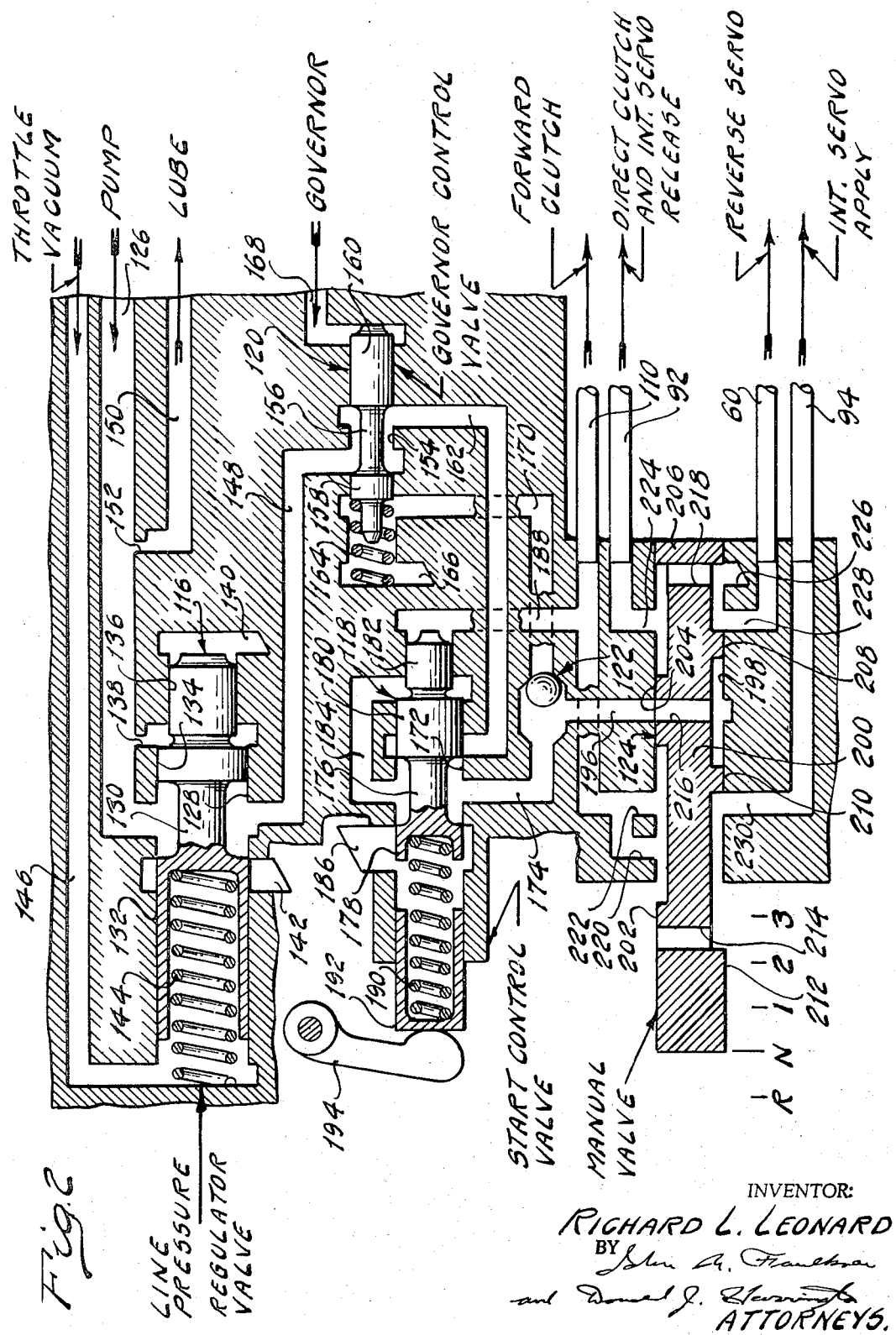

3,352,179
MULTIPLE SPEED RATIO POWER TRANSMISSION
SYSTEM WITH SEMI-AUTOMATIC CONTROLS
Richard L. Leonard, Farmington, Mich., assignor to Ford
Motor Company, Dearborn, Mich., a corporation of
Delaware
Filed June 9, 1965, Ser. No. 462,489
6 Claims. (Cl. 74—856)

ABSTRACT OF THE DISCLOSURE

This specification describes a semi-automatic control valve system for a power transmission mechanism having fluid pressure servo operated friction elements for controlling the relative motion of the gear elements in the torque delivery path. The friction elements serve as a neutral clutch for disengaging the engine from the driveline when the vehicle is brought to a stop thereby eliminating the need for a neutral clutch.

The system includes a start control valve for gradually engaging the friction elements during acceleration. After the fluid pressure operated servos are fully applied, a governor control valve overrules the action of the start control valve and maintains a fluid pressure feed passage to the friction elements that is independent of the start control valve.

My invention relates generally to semi-automatic power transmission mechanisms for use in an automotive vehicle driveline. More particularly my invention relates to a power transmission system having planetary gear elements, the relative motion of the gear elements being controlled by means of transmission clutches and brakes which in turn are actuated by fluid pressure operated servos.

The planetary gear system includes torque input elements that may be connected directly to the crankshaft of an internal combustion engine in an automotive vehicle driveline. Power output elements of the gear system can be connected by means of a drive shaft and a differential and axle assembly to the vehicle traction wheels.

There is no requirement in the driveline of my invention for a selectively engageable neutral clutch between the engine crankshaft and power input portions of the gear system. Neither is there a requirement for a hydrokinetic coupling at this location in the torque delivery path. According to a principal feature of my invention, the selectively engageable friction clutches used to control the relative motion of the gear elements in the gear system can be used also to provide a neutral condition. That is, they may be employed to interrupt the torque delivery path between the engine crankshaft and the power input elements of the gearing when the vehicle comes to a stop with the engine idling.

The provision of a semi-automatic power transmission mechanism having a multiple purpose clutch arrangement of the type above described being a principal object of my invention, it is a further object of my invention to provide a semi-automatic power transmission mechanism having clutch and brake controlled gear elements with means for automatically disengaging the torque source from the power input element of the gear system when the vehicle is stalled.

It is a further object of my invention to provide a simplified control valve system for a semi-automatic power transmission mechanism including a start-up control valve for controlling the clutch and brake servo pressure in accordance with changing operating torque demand by the vehicle operator.

It is a further object of my invention to provide a semi-automatic control valve system of the type above set forth and which includes means for overruling the influence of the start-up control valve in response to increases in vehicle speed.

For the purpose of describing my invention, reference will be made to the accompanying drawing, wherein:

FIGURE 1 shows in schematic form a longitudinal cross sectional view of the torque delivery elements of the transmission mechanism of my invention; and FIGURE 2 shows in schematic form a valve system for controlling the clutch and brake servos illustrated schematically in FIGURE 1.

In FIGURE 1, numeral 10 designates an internal combustion engine that may be used in an automotive vehicle driveline. Numeral 12 designates the road wheels for the vehicle. The engine 10 includes an air-fuel mixture intake manifold shown in part at 14. Delivery of an air-fuel mixture to manifold 14 is controlled by a carburetor 16 which includes a throttle valve located in the flow upstream region of the manifold 14. The position of the carburetor throttle valve is controlled in turn by a driver operated linkage 18.

The crankshaft of the internal combustion engine 10 is connected to a power input shaft 20 for a planetary gear system. If desired, a suitable vibration damper assembly 22 can be situated between the crankshaft and the shaft 20.

Drivably connected to the shaft 20 is a positive displacement fluid pressure pump 24. It includes a first gear element 26 which meshes with an internal gear element 28. Both gear elements 26 and 28 are disposed within the pump cavity.

The gear system includes a pair of simple planetary gear units 30 and 32. Gear unit 30 comprises a ring gear 34, a carrier 36, planet pinions 38, and a sun gear 40. Pinions 38 journaled rotatably upon a carrier 36 mesh with ring gear 34 and sun gear 40. Carrier 36 in turn is connected directly to power output shaft 42, which is connected by means of the drive shaft and the differential and axle assembly, mentioned previously, to the road wheels 12.

Gear unit 32 includes a carrier 48, upon which the pinions 46 are journaled, and the previously mentioned sun gear 40. Sun gear 40 is common to both gear units 30 and 32. Pinions 46 engage drivably sun gear 40 and a ring gear 44. Ring gear 44 is connected directly to power output shaft 42.

Carrier 48 defines a brake drum 50 about which is positioned friction brake band 52. This brake band is applied and released by means of a fluid pressure operated reverse and low servo 54. The servo 54 includes a cylinder 56 within which is slidably positioned a piston 58. This piston cooperates with cylinder 56 to define a working chamber that may be supplied with working pressure by means of a feed passage 60. The servo spring 62 tends normally to return the piston to the brake releasing positions.

Motion of the piston is transferred to the operating end of the brake band 52 by means of a suitable leverage shown schematically at 64.

The brake drum 50 is adapted to be anchored against rotation in one direction by means of an overrunning brake shown in part at 66. This brake may include rollers and an inner race 68 that forms a part of or is connected to drum 50. The outer race 70 for the brake 66 can be cammed to permit camming action between the rollers and the stationary race. The race 70 in turn is connected to the stationary housing 72.

A direct and reverse clutch is shown at 74. It includes a servo having an annular cylinder 76 within which is slidably positioned an annular piston 78. The piston and the cylinder cooperate to define a working chamber which may be supplied with working pressure by means of a feed passage 80.

The periphery of the cylinder 76 defines a brake drum 82 about which is positioned an intermediate friction brake band 84. This brake band can be applied and released by means of a fluid pressure operated intermediate brake servo 86. That servo comprises a cylinder 88 which receives slidably a servo piston 90. The piston 90 cooperates with the servo cylinder 88 to define on opposed sides thereof a pair of working chambers. One chamber is supplied with working pressure by means of a feed passage 92 and pressure distribution to the other working chamber of the servo 86 can be supplied through a feed passage 94. The effective area on the right-hand side of the piston 90 is greater than the effective area on the left-hand side thereof. Thus when both pressure chambers of the servo 86 are pressurized, the servo assumes an inoperative brake release position.

The motion of the piston 90 is transferred to the operating end of the brake band 84 by means of a suitable linkage shown schematically at 96. The inactive ends of the brake bands 84 and 52 act as reaction points, the reaction being transferred directly to the transmission housing.

The clutch 74 includes a member 98 which carries internally splined friction discs. These discs cooperate with externally splined friction discs carried by the drum 82. Member 98 is connected directly to a clutch drum 100 for a forward clutch identified generally by reference character 102. Drum 100 may be formed directly with or may be connected to member 98. Drum 100 carries externally splined friction discs which are situated in interdigital relationship with respect to internally splined friction discs, the latter in turn being carried by a clutch member 104 that is directly connected to ring gear 34. Drum 100 defines an annular cylinder 106 within which is positioned an annular piston 108. Piston 108 and cylinder 106 cooperate to define an annular working chamber which may be supplied with working fluid pressure through a feed passage 110.

The passage 80 which feeds the direct and reverse clutch 74 is in continuous fluid communication with passage 92 which feeds the side of the intermediate servo 86.

Clutch drum 82 of the direct and reverse clutch 74 is connected directly to sun gear 40 by means of a drive shell 112 which encloses the clutch 102 and the planetary gear unit 30.

A compound governor valve assembly 114 is connected drivably to power output shaft 42. It responds to changes in speed of the shaft 42 to produce a pressure signal that is related in magnitude to vehicle speed. Reference can be made to copending application Ser. No. 277,815, filed May 3, 1963, now abandoned, for a description of the mode of operation of a governor valve assembly of the type shown in FIGURE 1. Reference may be made to that application also for the purpose of supplementing the description contained herein of the fluid pressure operated clutch and brake servos and the torque transmitting gearing. That copending application is assigned to the assignee of this invention.

During operation of the mechanism illustrated schematically in FIGURE 1, the engine delivers torque to the clutch drum 100 and to the clutch member 98 to establish forward drive operation. The forward clutch 102 is applied. Thus torque is delivered through the forward clutch 102 to the ring gear 34. The carrier 36 tends to resist rotation of the gear 34 since it is connected to the driven shaft 42. Thus sun gear 40 tends to rotate in a direction opposite to the direction of rotation of the ring gear 34. This tends to rotate ring gear 44 in the same direction as the direction of rotation of the ring gear 34. Carrier 48 is anchored by the overrunning brake shown in part at 66. Thus the carrier 48 acts as a reaction point for the gear system as the carrier 36 applies driving torque to the shaft 42. Ring gear 44 also delivers a forward driving torque to shaft 42 as a split torque delivery path is established.

To establish intermediate speed ratio operation it merely is necessary to engage the intermediate band 84 as forward clutch 102 remains applied. This causes sun gear 40 to become anchored. It therefore serves as a reaction point. Engine torque then is delivered directly to ring gear 34, and carrier 36 acts as a torque output element as it delivers a forward driving torque to shaft 42. Gear unit 32 is inoperative under these conditions and carrier 48 freewheels by reason of the freewheeling action of the brake shown in part at 66.

To establish high speed ratio, direct drive operation, both friction brake bands 84 and 52 are released and clutches 74 and 102 are applied. This establishes a direct connection between the sun gear 40 and the ring gear 34. Thus the elements of the gearing rotate together in unison with a 1:1 driving speed ratio.

Reverse drive operation is obtained by applying brake band 52, releasing brake band 84, releasing forward clutch 102 and applying direct and reverse clutch 74. Engine torque then is delivered through clutch 74 to the sun gear 40. The carrier 48 acts as a reaction point since it is anchored by brake band 52. Thus with sun gear 40 acting as a power input element, the ring gear 44 is driven in a reverse direction. This reverse motion, of course, is transferred directly to the power output path 42. The planetary gear unit 30 remains inoperative under these conditions.

Continuous operation in the so-called manual low driving speed ratio is obtained by applying brake band 52 and releasing band 84, by releasing clutch 74 and by applying clutch 102. The power flow path is the same as it is during the previously described low speed ratio operation. But since the carrier 40 is inhibited from rotating in each direction, the gear system is capable of accommodating coasting torque.

In FIGURE 2, I have illustrated the control system for controlling the operation of clutch and brake servos. It includes a line pressure regulator valve 116, a start control valve 118, a governor control valve 120, a two position check valve or differential pressure valve 122 and a manual valve 124.

Pressure from pump 24 is delivered to the line pressure regulator valve 116 through passage 126. The regulator valve includes a valve body within which is formed a valve chamber 128. A valve spool 130 is slidably positioned within the chamber 128. It includes spaced lands 132, 134 and 136. The diameter of land 136 is slightly smaller than the diameter of land 134. This creates a differential area that is in fluid communication with passage 126 through a restricted port 138. The right-hand end of valve chamber 128 is exhausted through an exhaust port 140.

A second exhaust port 142 is formed in the chamber 128 adjacent land 132. Valve spool 130 is urged in a right-hand direction, as viewed in the drawing, by valve spring 144. A throttle pressure passage 146 communicates with the chamber on the left-hand side of the valve spool 130. This chamber communicates with a source of a throttle pressure signal that is proportional in magnitude to the pressure in the intake manifold 14 of the internal combustion engine. This pressure signal source may be of the form shown in copending application Ser. No. 277,815, identified previously.

The pressure signal in passage 146 is distributed to the left-hand end of the valve spool 130. It establishes a pressure force on the valve spool 130 that supplements the force of spring 144. The magnitude of the pressure in passage 146 is proportional in magnitude to engine torque since it is determined by engine manifold pressure. It is apparent, therefore, that the regulated pressure level maintained by the regulator valve spool 130 will be related closely to engine torque. The output side of the regulator valve 116 is in the form of a control pressure passage 148 which communicates with passage 126 through the chamber 128.

A lubrication oil pressure passage 150 communicates with the pump delivery passage 126 through a restricted port 152. This passage may extend to various lubrication points in the transmission system.

Passage 148 communicates with a valve chamber 154 for the governor control valve 120. Slidably disposed in chamber 154 is a valve spool 156 having formed thereon spaced valve lands 158 and 160. The output side of the valve 120 comprises a delivery passage 162 which communicates with the chamber 154 at a location spaced from the passage 148. A valve spring 164 acts on the left-hand end of the spool 156 and urges it in a right-hand direction. The cavity occupied by the spring 164 is exhausted through an exhaust port 166.

The governor valve assembly 114 distributes a governor pressure signal through a passage 168 to the valve chamber 154 so that a governor pressure signal will act upon the right-hand end of the valve land 160. This produces a force that opposes the force of spring 164.

When the valve spool 156 assumes the position shown, a control pressure passage 170 communicates with the chamber 154 at the location of the cavity that is occupied by the spring 164. This passage 170 extends to check valve 122.

Passage 162 extends to a valve chamber 172 for the start control valve 118. Another passage 174 extends from the check valve 122 to the chamber 172 which communicates at a location adjacent passage 162.

A start control valve spool 176 is slidably disposed in chamber 172. It is formed with spaced valve lands 178 and 180 having equal relatively large diameters and with a smaller diameter valve land 182. Lands 180 and 182 define a differential area that is in fluid communication with a crossover passage 184. This passage communicates with passage 174 through the chamber 172.

An exhaust port 186 communicates with chamber 172 and is controlled by land 178. Communication between passage 162 and chamber 172 is controlled by land 180.

The passage 110, which communicates as previously mentioned with a forward clutch 102, communicates with a branch passage 188 which in turn distributes forward clutch pressure to the right-hand end of valve land 182 thus creating a pressure force acting in a left-hand direction on the valve spool 178.

A valve spring 190 acts on a left-hand end of the spool 176. It is situated between the land 178 and a valve plunger 192. This plunger is slidably disposed within one end of valve chamber 172. It can be moved in a right-hand direction by a linkage element 194 that is under the control of the vehicle operator. Linkage element 194 can be connected mechanically to the engine carburetor throttle linkage shown in part at 18. Thus as the engine carburetor throttle is moved toward an advanced position, the plunger 192 will be shifted in a right-hand direction thereby increasing the spring force of spring 190. Control pressure passage 196 extends from the two-way check valve 122 to the valve chamber 198.

Slidably disposed within valve chamber 198 is a manual valve element 200. This element is formed with lands 202, 204, 206, 208, 210 and 212. Cross flow passages 214, 216 and 218 are formed in the valve element 200. Passage 110 communicates with the chamber 198 through spaced ports 220 and 222. Passage 92 communicates with chamber 198 through a port 224.

An exhaust port 226 is formed in the chamber 198, and each end of the valve chamber 198 communicates with the exhaust region. Passages 60 and 94 communicate with chamber 198 through ports 228 and 230, respectively.

Manual valve element 200 can be shifted to one of several driving ranges. These are indicated by the symbols R, N, 1, 2 and 3. In the position shown, valve element 200 is in the neutral position N. The other positions— namely positions R, 1, 2 and 3, correspond respectively to the Reverse drive position, First speed ratio position, Second speed ratio position and Third speed ratio position.

If the manual valve 200 is shifted from the neutral position shown to the First speed ratio position 1, passage 196 will communicate with passage 110 through the ports 220 and 222. Thus the forward clutch will become applied as pressure is made available to passage 196. Passage 92 will become exhausted and will remain exhausted during operation in the first speed ratio.

When the manual valve element 200 is shifted to the Second speed ratio position, passage 196 communicates with passage 94 across the valve chamber 198. Passage 60 becomes exhausted through exhaust port 226. Likewise passage 92 is exhausted through crossover passage 216 and port 228. Passage 110 continues to be pressurized since it is in communication with passage 196 through the space situated between lands 202 and 204.

High speed ratio, direct-drive operation is obtained by shifting the manual valve to position number 3. At that time passage 196 is brought into communication with passage 224. The passage 94 continues to be pressurized since it is in communication with passage 110 through passage 214. But since both sides of the servo for the intermediate speed ratio are pressurized, the servo assumes a brake releasing position. Passage 196 communicates with passage 94 across the valve chamber 198.

When the manual valve element is shifted to Reverse position R, the reverse servo passage 60 becomes applied and the forward clutch servo pressure passage 110 becomes exhausted. At the same time passage 92 becomes pressurized.

In each of the speed ratios pressure is distributed to the manual valve through passage 196. The manual valve then directs the pressure to the various servos depending upon its position. Passage 196 in turn is pressurized during a start-up from a standing start by reason of the action of the start control valve. If it is assumed that the vehicle is at rest, passage 148 is brought into communication with passage 162 through the governor control valve. As the vehicle operator depresses the accelerator pedal for the engine carburetor throttle, spring 190 becomes loaded. This causes communication to take place between passage 162 and passage 174. The two-way check valve 122 will then assume the right-hand position shown in the drawing to block passage 170. At the same time, pressure is distributed through the valve 118 from passage 174 to passage 196.

As the vehicle operator continues to depress the accelerator pedal, the degree of communication between passage 162 and passage 174 will continue to increase. This provides a pressure in passage 196 which is related functionally in magnitude to engine throttle position. Gradual engagement of the forward clutch then is accomplished.

When the forward clutch becomes applied, the pressure to which it is subjected is transferred to the right-hand valve of the valve land 182. This modifies the rate of clutch pressure build-up during the engagement period since the clutch pressure force provides a certain degree of feedback. It should be noted, however, that passage 188 is not pressurized during the engagement of the reverse clutch as the vehicle is accelerated from a standing start in reverse drive range. Under these conditions the clutch pressure build-up in the direct clutch will be modified to provide the increase in the servo pressure that is made necessary by the increased torque reaction of the friction elements of the driveline during reverse drive operation.

When the vehicle is moving at a significant speed, the governor pressure in passage 168 will be sufficient to shift the governor control valve in a left-hand direction. This blocks communication between passage 148 and passage 162. At the same time communication between passage 148 and passage 170 is established. The two-way check valve 122 will then shift in a left-hand direction and pressure will be distributed directly from passage 170 to the passage 196 thereby rendering the start control valve ineffective.

The governor control valve then is effective to prevent a torque delivery path interruption when the vehicle is moving as the vehicle operator relaxes the engine throttle to provide coast-braking.

The area on the right-hand end of land 182 of the start control valve and the relationship between carburetor throttle setting and line pressure build-up can be modified to satisfy the forward clutch engagement characteristics.

The manual valve is calibrated so that the low speed ratio servo pressure passage 60 is pressurized during operation in the low speed ratio range. As the vehicle operator shifts the manual valve to the intermediate speed ratio range, the passage 60 becomes exhausted at a time prior to the distribution of pressure to passage 94. Thus when a speed ratio shift from the low speed ratio to the intermediate speed ratio is made, the intermediate speed ratio becomes established as the overrunning brake 66 begins to freewheel. There is no timing necessary between the disengagement of the band 52 and the engagement of the band 84. Use of the band 52 during low speed ratio operation will permit the driveline to transfer coast-braking torque.

Since the start-up control valve is sensitive to the driving torque demand of the vehicle operator, it is not possible for the engine to "run away" as the vehicle operator demands torque rapidly. The actual base line pressure from which the calibration of the start control valve is made is determined by the engine manifold pressure and by the line pressure regulator valve which responds to manifold pressure.

Having thus described a preferred form of my invention, what I claim and desire to secure by U.S. Letters Patent is:

1. In a semi-automatic power transmission mechanism for use in a vehicle driveline having an engine and a driven member, multiple speed ratio gearing defining plural torque delivery paths between the engine and said driven member, clutch and brake servo means for controlling the relative motion of the elements of said gearing, a fluid pressure source drivably connected to said engine, passage structure interconnecting said pressure source and said servo means, a driver controlled manual valve means situated in and partly defining said passage structure for distributing selectively control pressure to said servo means thereby establishing speed ratio changes, a driver controlled start control valve means in fluid communication with said manual valve means for controlling pressure distribution to said servo means and increasing pressure of the fluid distributed to said servos through said passage structure in accordance with driver torque demand, a source of a governor pressure signal that is proportional in magnitude to the driven speed of said driven member, and a branch passage extending from said pressure source to said manual valve means, said branch passage being defined in part by a movable governor control valve, said governor control valve communicating with said governor pressure signal source and shiftable by said governor pressure signal to a position that establishes communication between said manual valve means and said pressure source when the driven speed exceeds a predetermined value.

2. In a semi-automatic power transmission mechanism for use in a vehicle driveline having an engine and a driven member, multiple speed ratio gearing defining plural torque delivery paths between said engine and said driven member, clutch and brake servo means for controlling relative motion of the elements of said gearing, a fluid pressure source drivably connected to said engine, passage structure interconnecting said pressure source and said servo means, a driver controlled manual valve means situated in and partly defining said passage structure for distributing selectively control pressure to said servo means thereby establishing speed ratio changes, a driver controlled start control valve means in fluid communication with said manual valve means for controlling pressure distribution to said servo means and increasing pressure of the fluid distributed to said servos through said passage structure in accordance with driver torque demand, line pressure regulator valve means in fluid communication with said pressure source for regulating the effective pressure maintained by said source in accordance with the torque delivered by said engine, a source of a governor pressure signal that is proportional in magnitude to the driven speed of said driven member, a branch passage extending from said pressure source to said manual valve means, said branch passage being defined in part by a movable governor control valve, said governor control valve communicating with said governor pressure signal source and shiftable by said governor pressure signal to a position that establishes communication between said manual valve means and said pressure source when the driven speed exceeds a predetermined value, and a two-way differential pressure valve between said manual valve means and each of said start control valve means and said governor control valve, said differential pressure valve being subjected to the output pressure of said start control valve means and to said governor pressure signal, said differential pressure valve establishing communication between said start control valve means and said manual valve means when the ratio of the output pressure of said start control valve means to said governor pressure signal increases and establishing communication between said pressure source and said manual valve means when said ratio decreases.

3. In a semi-automatic power transmission mechanism for use in a vehicle driveline having an engine and a driven member, multiple speed ratio gearing defining plural torque delivery paths between said engine and said driven member, clutch and brake servo means for controlling relative motion of the elements of said gearing, a fluid pressure source drivably connected to said engine, passage structure interconnecting said pressure source and said servo means, a driver controlled manual valve means situated in and partly defining said passage structure for distributing selectively control pressure to said servo means thereby establishing speed ratio changes, a driver controlled start control valve means in fluid communication with said manual valve means for interrupting pressure distribution to said servo means when driver torque demand is reduced and increasing pressure of the fluid distributed to said servos through said passage structure in accordance with driver torque demand, and a governor controlled valve means responsive to the driven speed of said driven member for overruling the action of said start control valve means when the vehicle speed is greater than a predetermined value.

4. In a semi-automatic power transmission mechanism for use in a vehicle driveline having an engine and a driven member, multiple speed ratio gearing defining plural torque delivery paths between said engine and said driven member, clutch and brake servo means for controlling relative motion of the elements of said gearing, a fluid pressure source drivably connected to said engine, passage structure interconnecting said pressure source and said servo means, a driver controlled manual valve means situated in and partly defining said passage structure for distributing selectively control pressure to said servo means thereby establishing speed ratio changes, a driver controlled start control valve means in fluid communication with said manual valve means for interrupting pressure distribution to said servo means when driver torque demand is reduced and increasing pressure of the fluid distributed to said servos through said passage structure in accordance with driver torque demand, line pressure regulator valve means in fluid communication with said pressure source for regulating the effective pressure maintained by said source in accordance with the torque delivered by said engine, and a governor controlled valve means responsive to the driven speed of said driven member for overruling the action of said start control valve means when the vehicle speed is greater than a predetermined value.

5. In a semi-automatic power transmission mechanism for use in a vehicle driveline having an engine and a driven member, multiple speed ratio gearing defining plural torque delivery paths between said engine and said driven member, clutch and brake servo means for controlling relative motion of the elements of said gearing, a fluid pressure source drivably connected to said engine, passage structure interconnecting said pressure source and said servo means, a driver controlled manual valve means situated in and partly defining said passage structure for distributing selectively control pressure to said servo means thereby establishing speed ratio changes, a driver controlled start control valve means in fluid communication with said manual valve means for interrupting pressure distribution to said servo means when driver torque demand is reduced and increasing pressure of the fluid distributed to said servos through said passage structure in accordance with driver torque demand, and a governor controlled valve means responsive to the driven speed of said driven member for overruling the action of said start control valve means when the vehicle speed is greater than a predetermined value, said governor control valve means and said start control valve means being situated in parallel disposition with respect to each other in said passage structure between said source and said manual valve, said governor controlled valve means establishing a fluid pressure delivery passage from said source to said manual valve when the driven speed increases and establishing a pressure delivery path between said source and said start control valve when the driven speed decreases.

6. In a semi-automatic power transmission mechanism for use in a vehicle driveline having an engine and a driven member, multiple speed ratio gearing defining plural torque delivery paths between said engine and said driven member, clutch and brake servo means for controlling relative motion of the elements of said gearing, a fluid pressure source drivably connected to said engine, passage structure interconnecting said pressure source and said servo means, a driver controlled manual valve means situated in and partly defining said passage structure for distributing selectively control pressure to said servo means thereby establishing speed ratio changes, a driver controlled start valve means in fluid communication with said manual valve means for interrupting pressure distribution to said servo means when driver torque demand is reduced and increasing pressure of the fluid distributed to said servos through said passage structure in accordance with driver torque demand, line pressure regulator valve means in fluid communication with said pressure source for regulating the effective pressure maintained by said source in accordance with the torque delivered by said engine, a governor controlled valve means responsive to the driven speed of said driven member for overruling the action of said start control valve means when the vehicle speed is greater than a predetermined value, said governor controlled valve means and said start control valve means being situated in parallel disposition with respect to each other in said passage structure between said source and said manual valve, said governor controlled valve means establishing a fluid pressure delivery passage from said source to said manual valve when the driven speed increases and establishing a torque delivery path between said source and said start control valve when the driven speed decreases.

References Cited

UNITED STATES PATENTS

| | | | |
|---|---|---|---|
| 2,737,824 | 3/1956 | Livermore | 74—472 |
| 2,852,959 | 9/1958 | Isaacson et al. | 74—754 |
| 2,903,910 | 9/1959 | Carnegie | 74—645 |
| 3,000,233 | 9/1961 | Roche | 74—645 |
| 3,080,764 | 3/1963 | Miller et al. | |
| 3,157,067 | 11/1964 | Tuck et al. | 74—754 |
| 3,215,237 | 11/1965 | Davies et al. | 192—87 |

DONLEY J. STOCKING, *Primary Examiner.*

THOMAS C. PERRY, *Examiner.*